Patented Mar. 3, 1931

1,794,526

UNITED STATES PATENT OFFICE

ANDREW LUNDTEIGEN, OF KANSAS CITY, MISSOURI, AND GUY O. GARDNER, OF CHANUTE, KANSAS, ASSIGNORS TO ASH GROVE LIME & PORTLAND CEMENT COMPANY, OF KANSAS CITY, MISSOURI, A CORPORATION OF MAINE

PORTLAND CEMENT

No Drawing.    Application filed July 11, 1927.    Serial No. 205,035.

This invention relates to improvements in Portland cement, and refers more particularly to a quick hardening cement which besides giving the usual working time, or initial set of the normal commercial Portland cement, has in addition the advantage of quick hardening and increased strength.

As is well known, Portland cement is a product obtained by finely pulverizing clinker produced by calcining to incipient fusion an intimate and properly proportioned mixture of argillaceous and calcareous materials with no addition subsequent to calcination, except (water and calcined or uncalcined) gypsum.

The product which forms the subject matter of the present invention is properly a Portland cement which is the result of carefully controlled operations compared to the present usual methods of manufacturing cement. Furthermore, the improved product has added thereto materials which produce the quick hardening effect as will hereinafter be described in more detail.

A typical operation for making the product of the present invention is as follows: To begin with the argillaceous material, or clay is selected from three sources—one consisting of a relatively high aluminum clay, another of clay of relatively high silica content, and a clay containing a small percentage of iron.

The argillaceous materials and the limestone (calcium carbonate), are first crushed to pass a screen of one and one-half inch mesh, or under. The clay and limestone are then combined in proper proportions and ground with water in a ball mill to twenty mesh or under. (The fines of this mixture proceed to a tube mill and the coarse material is returned to be reground.) In the tube mill the fines are further pulverized, in the presence of water, samples being taken off at intervals of not more than an hour and tested for fineness and analyzed to assure proper proportioning of the calcium carbonate, alumina and silica. The mix is so adjusted that the calcium carbonate content of the raw mix is substantially five-tenths per cent higher than the normal or usual mixes. This proportion will vary according to composition of the raw materials and the character of the final product desired.

The mixture is then conducted to a slurry tank, which is equipped with air and mechanical agitators, and from the slurry tank the mix is transferred to correcting basins or kiln feed basins. Again the mix is tested and analyzed, and any deficiency in lime, alumina or silica is corrected. From the feed basins the slurry is elevated or pumped into a feed trough over the intake of the kiln, which is fired to a temperature in the neighborhood of 2700° F. Any suitable fuel may be used for firing. Oil or gas perhaps are most satisfactory as they do not contaminate the clinker with foreign matter in the way of ash, and are more completely consumed during combustion. The clinker is discharged from the kiln or kilns at a temperature of substantially 2000° F., and is immediately quenched with water. The clinker is passed direct from the kiln through a rotary cooler and at the discharge from the cooler from three per cent to seven per cent of gypsum is added.

From the cooler the material is directed by conveyors to crushing and grinding means, where it is pulverized so that something over twenty per cent passes the two hundred mesh screen.

Up to this point in the process the separate stages or features of the operation have been substantially the normal practice in cement making with the exception perhaps of the quenching of the clinker on its discharge from the kilns. Here, however, we have a radical change in the methods heretofore used, in that there is added a pre-mixed combination of inorganic chlorides to an amount not to exceed 5% according to the nature of the chloride or chlorides used. A typical instance may consist of 0.9% sodium chloride and 0.1% calcium chloride. These or other chlorides alone or in combination so that the cement contains from 0.1% to 1.0% of chlorine as chloride have proven satisfactory in varying degrees. Ammonium chloride has not proven satisfactory however. Furthermore, there may be added 0.15% more or less of aluminum stearate, or any other metal soap, which serves largely as a lubricant in the final grinding operation. In place of metal soap directly added the invention contemplates the use of alternative materials, such as mineral, animal or vegetable oils, or combinations of the same, stearic or other fatty acids, or any type of material which would function as a grinding lubricant, plasticizing agent, water repellent and keep down the temperature, in the final grinding stage. The addition of the sodium chloride, calcium chloride and aluminum stearate, differentiates the product materially from the common well-known Portland cement of commerce. It is believed that the chlorides function as hydration accelerators, or produces what may be termed as a catalytic acceleration of the hydration action during the hardening of the cement or concrete when laid.

The oil or metal soaps by reason of their water repellent action tend to prevent sack hardening. Before final grinding there may be added also quick lime to an amount of five-tenths of one per cent more or less, which serves to absorb the water or moisture introduced by the chemicals or still present in the quenched clinkers, and at the same time reacts on free and loosely held carbon dioxide ($CO_2$). Also the lime increases the plasticity of the final product, and prevents sack hardening in storage by reason of its avidity for moisture being greater than that of the cement.

The final grinding results in a product which is preferably pulverized to at least ninety-five per cent passing a two hundred mesh screen as compared to the standard Portland cement in which normally seventy-eight per cent is required to pass a two hundred mesh screen.

This improved Portland cement product then is truly of the nature of Portland cement, and gives, or permits the normal working period, and in addition affords the attributes of a quick hardening cement. There is no excess of heat produced during the setting which would cause deterioration, but on the other hand the hardening of the cement is by a progressive rate. There is a certain amount of heat produced, but it is not in an amount sufficient to dry the mix to the extent that it effects hydration adversely.

It is found, however, that there is sufficient heat produced to be beneficial to the proper hardening in cold weather. The cement, which is the product of this process, has an increased tensile strength, and crushing strength, as compared with the common Portland cement. Furthermore it has the ability of hardening within a period of one day, to produce strength which is comparable to that ordinarily attained by present standard specification Portland cement at a period of twenty-eight days. The periods of workability and setting are substantially the same as the common type of Portland cement.

A typical illustration of strengths of hardened mortars and concretes made by this process is as follows:

*Tensile Strength Test*
(Pounds per square inch)
1-3 cement—Standard Ottawa. Sand briquettes

|  | 1 day | 2 days | 3 days | 5 days | 7 days | 28 days |
|---|---|---|---|---|---|---|
| Average pounds | 330 | 352 | 378 | 398 | 430 | 538 |

*Compressive Strength Test*
(Pounds per square inch)
2" x 2" cubes 1-3 Cement—Standard sand mortar

|  | 1 day | 2 days | 3 days | 5 days | 7 days | 28 days |
|---|---|---|---|---|---|---|
| Average pounds | 3755 | 6758 | 7673 | 8390 | 9891 | 12212 |

6" x 12" cylinders—1-2-3½% concrete slump 3"

|  | 1 day | 2 days | 3 days | 5 days | 7 days | 28 days |
|---|---|---|---|---|---|---|
| Average pounds | 2130 | 3289 | 3457 | 3731 | 4089 | 5271 |

For comparison the strength of these mortars at one day are greater than present standard specification for Portland cement requires at twenty-eight days, and the twenty-eight day strength of this quick-hardening cement is more than 50% greater than standard specification for Portland cement requires at same period and of same mix.

The addition of chlorides in the manufacture of the improved product thereinbefore described is effected by adding chlorides of sodium and calcium. The invention, however, contemplates that other chlorides may as well be used, such as chloride of iron, barium, magnesium, potassium or others permitted by commercial conditions.

I claim as my invention:

1. A method of making a quick hardening cement which comprises adding to a clinker formed from argillaceous and calcareous materials, gypsum and a mixture of calcium and sodium chlorides in amount sufficient to act as accelerators for hardening in the final product, and grinding the aggregate so produced in the presence of a lubricant to the extent that at least 78 per cent passes a 200-mesh screen.

2. A method of making a quick hardening cement which comprises adding to a clinker formed from argillaceous and calcareous materials, gypsum and a mixture of calcium and sodium chlorides in amount sufficient to act as accelerators for hardening in the final product, and grinding the aggregate so produced in the presence of an insoluble soap to the extent that at least 78 per cent passes a 200-mesh screen.

3. A method of making a quick hardening cement which comprises adding to a clinker formed from argillaceous and calcareous materials, gypsum and a mixture of calcium and sodium chlorides in amount sufficient to act as accelerators for hardening in the final product, and grinding the aggregate so produced in the presence of a lubricant to the extent that at least 78 per cent passes a 200-mesh screen, and adding before the completion of the grinding a small amount of quick-lime.

4. A quick hardening cement comprising a fused and ground mixture of limestone and argillaceous material, which mixture contains both sodium and calcium chlorides in amounts sufficient to act as accelerators of hardening.

5. A quick hardening cement comprising a fused and ground mixture of limestone and argillaceous material, which mixture contains both sodium and calcium chlorides in amounts sufficient to act as accelerators of hardening, said mixture also containing a water repellent material.

6. A quick hardening cement comprising a fused and ground mixture of limestone and argillaceous material, said mixture containing both sodium and calcium chlorides in amounts sufficient to act as accelerators of hardening, the sodium chloride being in substantial excess over the calcium chloride.

7. A quick hardening cement comprising a fused and ground mixture of limestone and argillaceous material, said mixture containing both calcium and sodium chlorides in an amount of less than 1 per cent, the sodium chloride being present in substantial excess over the calcium chloride, the mixture also containing an insoluble soap which acts as a water repellent material, and having incorporated therewith lime in small amounts.

ANDREW LUNDTEIGEN.
GUY O. GARDNER.